US008811886B2

(12) United States Patent
Turner et al.

(10) Patent No.: US 8,811,886 B2
(45) Date of Patent: Aug. 19, 2014

(54) APPARATUS AND METHOD FOR PROVIDING MEDIA SERVICES SUBJECT TO VIEWING RESTRICTIONS

(75) Inventors: Charles D Turner, San Diego, CA (US); Douglas Alman, San Marcos, CA (US); Brian Wilson, Johnston, IA (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 27 days.

(21) Appl. No.: 13/267,986

(22) Filed: Oct. 7, 2011

(65) Prior Publication Data

US 2013/0090129 A1    Apr. 11, 2013

(51) Int. Cl.
*H04H 20/71* (2008.01)
(52) U.S. Cl.
USPC ..................... 455/3.01; 455/456.1
(58) Field of Classification Search
CPC ........ H04L 67/18; H04W 4/02; H04W 12/08; H04W 64/00
USPC ................... 455/456.1–456.6, 3.01
See application file for complete search history.

(56) References Cited

U.S. PATENT DOCUMENTS

| | | | |
|---|---|---|---|
| 2002/0170053 A1* | 11/2002 | Peterka et al. ................. 725/31 |
| 2005/0170851 A1* | 8/2005 | Melpignano et al. ...... 455/456.5 |
| 2007/0002885 A1* | 1/2007 | Lee et al. ..................... 370/432 |
| 2007/0199015 A1* | 8/2007 | Lopez et al. .................... 725/31 |
| 2007/0291944 A1 | 12/2007 | Wingert |
| 2008/0066095 A1 | 3/2008 | Reinoso |
| 2008/0066103 A1* | 3/2008 | Ellis et al. ....................... 725/38 |
| 2010/0125866 A1 | 5/2010 | Sofos |
| 2010/0125867 A1 | 5/2010 | Sofos |
| 2011/0173650 A1* | 7/2011 | Jankins et al. .................. 725/25 |

* cited by examiner

*Primary Examiner* — Vladimir Magloire
(74) *Attorney, Agent, or Firm* — Guntin & Gust, PLC; Douglas Schnabel

(57) ABSTRACT

A system that incorporates teachings of the present disclosure may include, for example, determining that a communication device is outside of a restricted viewing area associated with media content and transmitting the media content for presentation at the communication device responsive to that determination. Other embodiments are disclosed.

19 Claims, 7 Drawing Sheets

500

APPARATUS AND METHOD FOR PROVIDING MEDIA SERVICES SUBJECT TO VIEWING RESTRICTIONS

FIELD OF THE DISCLOSURE

The present disclosure relates generally to telecommunications and more specifically to an apparatus and method for providing media services subject to viewing restrictions.

BACKGROUND

Consumer access to media content is central to the growth of the telecommunications industry. Increasingly, consumers demand the ability to view media content on a wide variety of mobile electronics devices. Media content owners frequently desire to control content availability to consumer devices. Licensing arrangements are often used to govern distribution of media content over telecommunication networks. As network capabilities expand, licensing arrangements are impacted by the unique capabilities of mobile devices.

DETAILED DESCRIPTION

The present disclosure describes, among other things, illustrative embodiments for providing media content subject to viewing restrictions. In one embodiment, a geographic location of a communication device relative to a restricted viewing area is used for media content distribution. Other embodiments are contemplated by the present disclosure.

One embodiment of the present disclosure includes a mobile communication device having a memory coupled to a processor. The processor can be operable to determine a geographic location of the mobile communication device. In turn, the processor can be operable to transmit the geographic location of the mobile communication device to a network device of a communication network. The processor can also be operable to receive media content from the network device conditioned upon a determination that the geographic location of the mobile communication device is outside of a restricted viewing area associated with the media content. The processor can be operable to present the media content on the mobile communication device.

One embodiment of the present disclosure includes a computer-readable storage medium including computer instructions, which, when executed by a processor, cause the processor to determine that media content is associated with a restricted viewing area. The computer instruction can also cause the processor to encode the media content with information that describes the restricted viewing area associated with the media content and to transmit the encoded media content to a mobile communication device. In turn, the mobile communication device is caused to present media content responsive to a determination that a geographic location of the mobile communication device is outside of the restricted viewing area associated with the media content.

One embodiment of the present disclosure includes a method including determining that a mobile communication device is outside of a restricted viewing area associated with a media content and transmitting the media content for presentation at the mobile communication device responsive to the determination.

Figure 1:
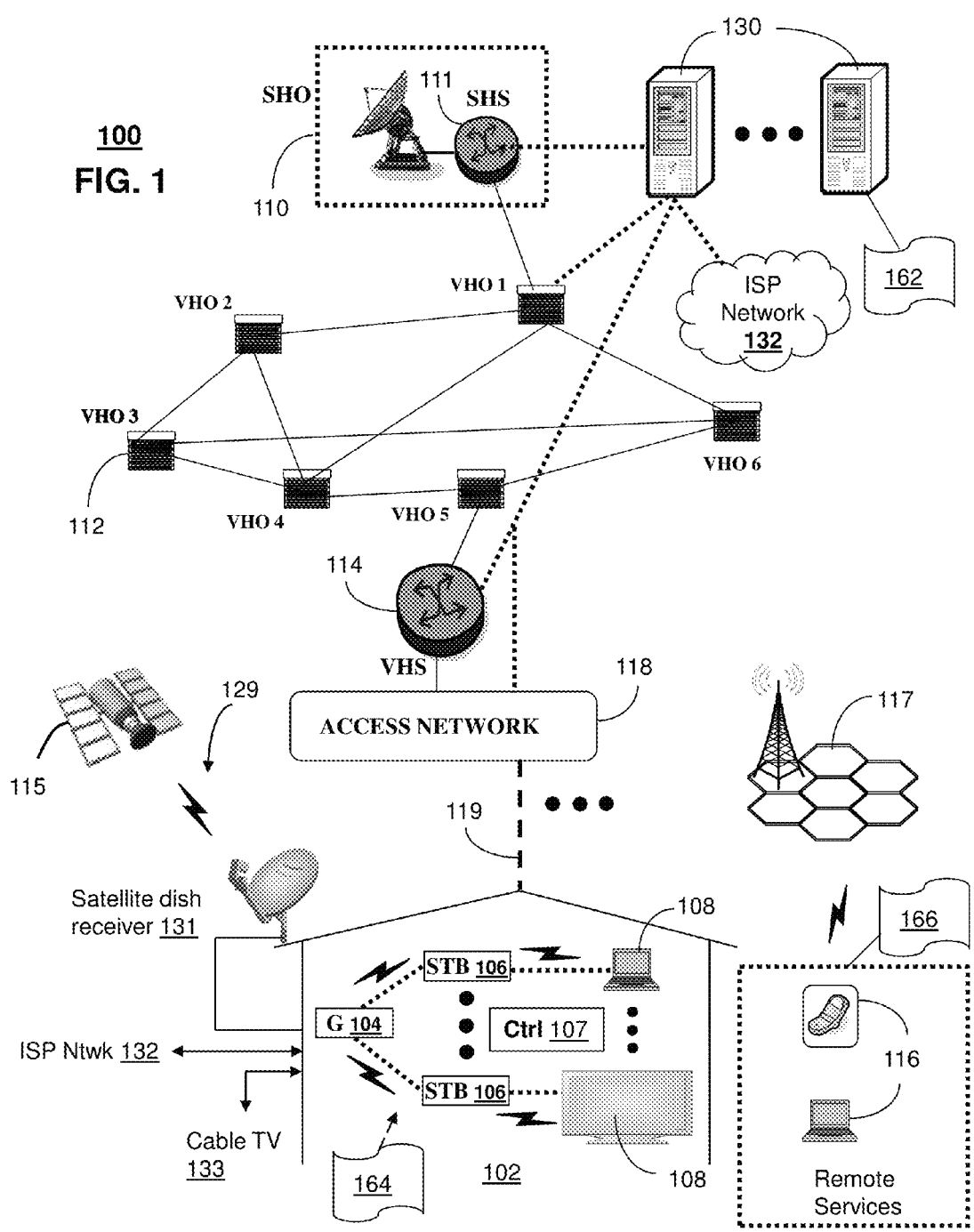
FIGS. 1-2 depict illustrative embodiments of communication systems that provide media services.

FIG. 1 depicts an illustrative embodiment of a first communication system 100 for delivering media content. The communication system 100 can represent an Internet Protocol Television (IPTV) media system. The IPTV media system can include a super head-end office (SHO) 110 with at least one super headend office server (SHS) 111 which receives media content from satellite and/or terrestrial communication systems. In the present context, media content can represent, for example, audio content, moving image content such as 2D or 3D videos, video games, virtual reality content, still image content, and combinations thereof. The SHS server 111 can forward packets associated with the media content to one or more video head-end servers (VHS) 114 via a network of video head-end offices (VHO) 112 according to a common multicast communication protocol.

The VHS 114 can distribute multimedia broadcast content via an access network 118 to commercial and/or residential buildings 102 housing a gateway 104 (such as a residential or commercial gateway). The access network 118 can represent a group of digital subscriber line access multiplexers (DSLAMs) located in a central office or a service area interface that provide broadband services over fiber optical links or copper twisted pairs 119 to buildings 102. The gateway 104 can use common communication technology to distribute broadcast signals to media processors 106 such as Set-Top Boxes (STBs) which in turn present broadcast channels to media devices 108 such as computers or television sets managed in some instances by a media controller 107 (such as an infrared or RF remote control).

The gateway 104, the media processors 106, and media devices 108 can utilize tethered communication technologies (such as coaxial, powerline or phone line wiring) or can operate over a wireless access protocol such as Wireless Fidelity (WiFi), Bluetooth, Zigbee, or other present or next generation local or personal area wireless network technologies. By way of these interfaces, unicast communications can also be invoked between the media processors 106 and subsystems of the IPTV media system for services such as video-on-demand (VoD), browsing an electronic programming guide (EPG), or other infrastructure services.

A satellite broadcast television system 129 can be used also in the media system of FIG. 1. The satellite broadcast television system can be overlaid, operably coupled with, or replace the IPTV system as another representative embodiment of communication system 100. In this embodiment, signals transmitted by a satellite 115 carrying media content can be received by a satellite dish receiver 131 coupled to the building 102. Modulated signals received by the satellite dish receiver 131 can be transferred to the media processors 106 for demodulating, decoding, encoding, and/or distributing broadcast channels to the media devices 108. The media processors 106 can be equipped with a broadband port to the ISP network 132 to enable interactive services such as VoD and EPG as described above.

In yet another embodiment, an analog or digital cable broadcast distribution system such as cable TV system 133 can be overlaid, operably coupled with, or replace the IPTV system and/or the satellite TV system as another representative embodiment of communication system 100. In this embodiment, the cable TV system 133 can also provide Internet, telephony, and interactive media services.

It is contemplated that the present disclosure can apply to any present or next generation over-the-air and/or landline media content services system.

Some of the network elements of the IPTV media system can be coupled to one or more computing devices 130, a portion of which can operate as a web server for providing web portal services over an Internet Service Provider (ISP) network 132 to wireline media devices 108 or mobile communication devices 116.

Multiple forms of media services can be offered to media devices over landline technologies such as those described above. Additionally, media services can be offered to media devices by way of a wireless access base station 117 operating according to common wireless access protocols such as Global System for Mobile or GSM, Code Division Multiple Access or CDMA, Time Division Multiple Access or TDMA, Universal Mobile Telecommunications or UMTS, World interoperability for Microwave or WiMAX, Software Defined Radio or SDR, Long Term Evolution or LTE, and so on. Other present and next generation wide area wireless network technologies are contemplated by the present disclosure.

Communication system 100 can also provide for all or a portion of the computing devices 130 to function as a media server device 130. The media server device 130 can use common computing and communication technology to perform function 162, which includes among things, distribution of media content subject to viewing area restrictions. The media server device 130 can be used to receive media content and to determine if the media content is associated with a restricted viewing area. The media server device 130 can also be used to receive geographic location information from a mobile communication device 116. The media server device 130 can further be used to transmit the media content to the mobile communication device 116 responsive to determining a relationship between the geographic location of the mobile device 116 and the restricted viewing area associated with the media content. The media server device 130 can be used to encode the media content with information describing the restricted viewing area and to transmit the encoded media content to a mobile communication device 116. The media server device 130 can also be used to send a notification to a mobile communication device 116 that the media content is blacked out from the mobile communication device 116 due to its location. The media server device 130 can further be used to provide a subscription service enabling a mobile communication device 116 to view the media content regardless of the viewing restriction. The media processors 106 and mobile communication devices 116 can be adapted with software functions 164 and 166, respectively, to further utilize the services of the media server device 130. For example, the media processors 106 and mobile communication devices 116 can be adapted to execute software functions 164 and 166, respectively, to determine geographic location information and to transmit this information to the media server device 130.

Figure 2:
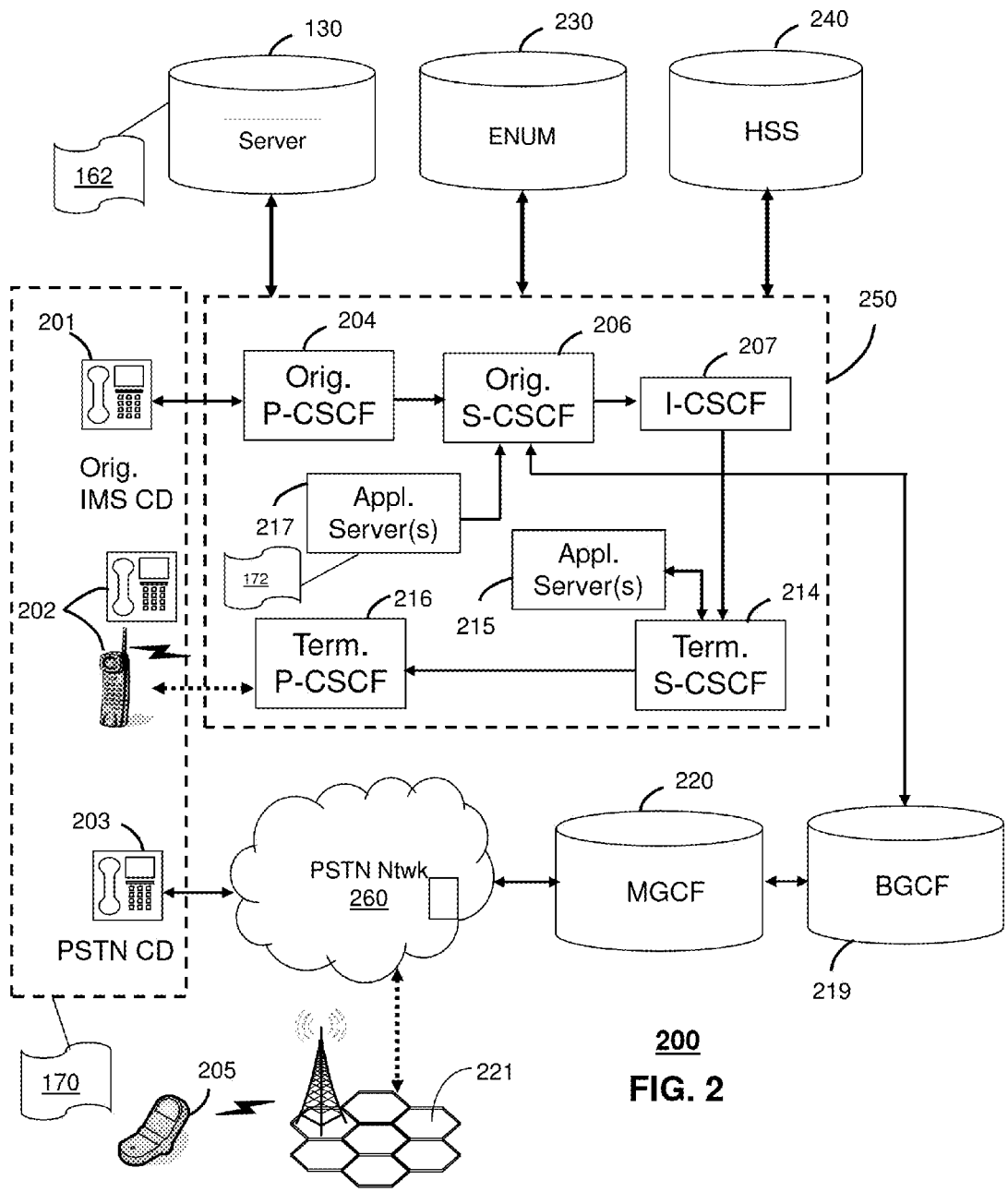

FIG. 2 depicts an illustrative embodiment of a communication system 200 employing an IP Multimedia Subsystem (IMS) network architecture to facilitate the combined services of circuit-switched and packet-switched systems. Communication system 200 can be overlaid or operably coupled with communication system 100 as another representative embodiment of communication system 100.

Communication system 200 can comprise a Home Subscriber Server (HSS) 240, a tElephone NUmber Mapping (ENUM) server 230, and other common network elements of an IMS network 250. The IMS network 250 can establish communications between IMS-compliant communication devices (CDs) 201, 202, Public Switched Telephone Network (PSTN) CDs 203, 205, and combinations thereof by way of a Media Gateway Control Function (MGCF) 220 coupled to a PSTN network 260. The MGCF 220 need not be used when a communication session involves IMS CD to IMS CD communications. A communication session involving at least one PSTN CD may utilize the MGCF 220.

IMS CDs 201, 202 can register with the IMS network 250 by contacting a Proxy Call Session Control Function (P-CSCF) which communicates with an interrogating CSCF (I-CSCF), which in turn, communicates with a Serving CSCF (S-CSCF) to register the CDs with the HSS 240. To initiate a communication session between CDs, an originating IMS CD 201 can submit a Session Initiation Protocol (SIP INVITE) message to an originating P-CSCF 204 which communicates with a corresponding originating S-CSCF 206. The originating S-CSCF 206 can submit the SIP INVITE message to one or more application servers (ASs) 217 that can provide a variety of services to IMS subscribers.

For example, the application servers 217 can be used to perform originating call feature treatment functions on the calling party number received by the originating S-CSCF 206 in the SIP INVITE message. Originating treatment functions can include determining whether the calling party number has international calling services, call ID blocking, calling name blocking, 7-digit dialing, and/or is requesting special telephony features (e.g., *72 forward calls, *73 cancel call forwarding, *67 for caller ID blocking, and so on). Based on initial filter criteria (iFCs) in a subscriber profile associated with a CD, one or more application servers may be invoked to provide various call originating feature services.

Additionally, the originating S-CSCF 206 can submit queries to the ENUM system 230 to translate an E.164 telephone number in the SIP INVITE message to a SIP Uniform Resource Identifier (URI) if the terminating communication device is IMS-compliant. The SIP URI can be used by an Interrogating CSCF (I-CSCF) 207 to submit a query to the HSS 240 to identify a terminating S-CSCF 214 associated with a terminating IMS CD such as reference 202. Once identified, the I-CSCF 207 can submit the SIP INVITE message to the terminating S-CSCF 214. The terminating S-CSCF 214 can then identify a terminating P-CSCF 216 associated with the terminating CD 202. The P-CSCF 216 may then signal the CD 202 to establish Voice over Internet Protocol (VoIP) communication services, thereby enabling the calling and called parties to engage in voice and/or data communications. Based on the iFCs in the subscriber profile, one or more application servers may be invoked to provide various call terminating feature services, such as call forwarding, do not disturb, music tones, simultaneous ringing, sequential ringing, etc.

In some instances the aforementioned communication process is symmetrical. Accordingly, the terms "originating" and "terminating" in FIG. 2 may be interchangeable. It is further noted that communication system 200 can be adapted to support video conferencing. In addition, communication system 200 can be adapted to provide the IMS CDs 201, 202 with the multimedia and Internet services of communication system 100 of FIG. 1. It is further contemplated that the CDs of FIG. 2 can operate as wireline or wireless devices. For example, the CDs of FIG. 2 can be communicatively coupled to a cellular base station 117 such as shown in FIG. 1, a femtocell (not shown), a WiFi router, a DECT base unit, or another suitable wireless access unit to establish communications with the IMS network 250 of FIG. 2.

If the terminating communication device is instead a PSTN CD such as CD 203 or CD 205 (in instances where the cellular phone only supports circuit-switched voice communications), the ENUM system 230 can respond with an unsuccessful address resolution which can cause the originating S-CSCF 206 to forward the call to the MGCF 220 via a Breakout Gateway Control Function (BGCF) 219. The MGCF 220 can then initiate the call to the terminating PSTN CD over the PSTN network 260 to enable the calling and called parties to engage in voice and/or data communications.

It is further appreciated that the CDs of FIG. 2 can operate as wireline or wireless devices. Although not shown, the CDs of FIG. 2 can be communicatively coupled to a cellular base station 221, a femtocell, a WiFi router, a DECT base unit, or another suitable wireless access unit to establish communications with the IMS network 250 of FIG. 2. The cellular access base station 121 can operate according to common wireless access protocols such as Global System for Mobile (GSM), Code Division Multiple Access (CDMA), Time Division Multiple Access (TDMA), Universal Mobile Telecommunications (UMTS), World interoperability for Microwave (WiMAX), Software Defined Radio (SDR), Long Tenn Evolution (LTE), and so on. Other present and next generation wireless network technologies are contemplated by the present disclosure. Accordingly, multiple wireline and wireless communication technologies are contemplated for the CDs of FIG. 2.

It is further contemplated that cellular phones supporting LTE can support packet-switched voice and packet-switched data communications and thus may operate as IMS-compliant mobile devices. In this embodiment, the cellular base station 221 may communicate directly with the IMS network 250.

Communication system 200 can include or otherwise be coupled to the media server device 130 of FIG. 1 for purposes similar to those described above. It is further contemplated by the present disclosure that the media server device 130 can perform the function 162 and thereby provide a media content distribution application for subscribers associated with CDs 201, 202, 203, and 205. CDs 201, 202, 203, and 205 can be adapted with software to perform function 170 to utilize and integrate with the media content distribution application performed by the media server device 130. It is further contemplated that the media server device 130 can be an integral part of the application server(s) 217, where the application server(s) 217 performs function 172, which can be substantially similar to function 162 and adapted to the operation of the IMS network 250.

Figure 3:
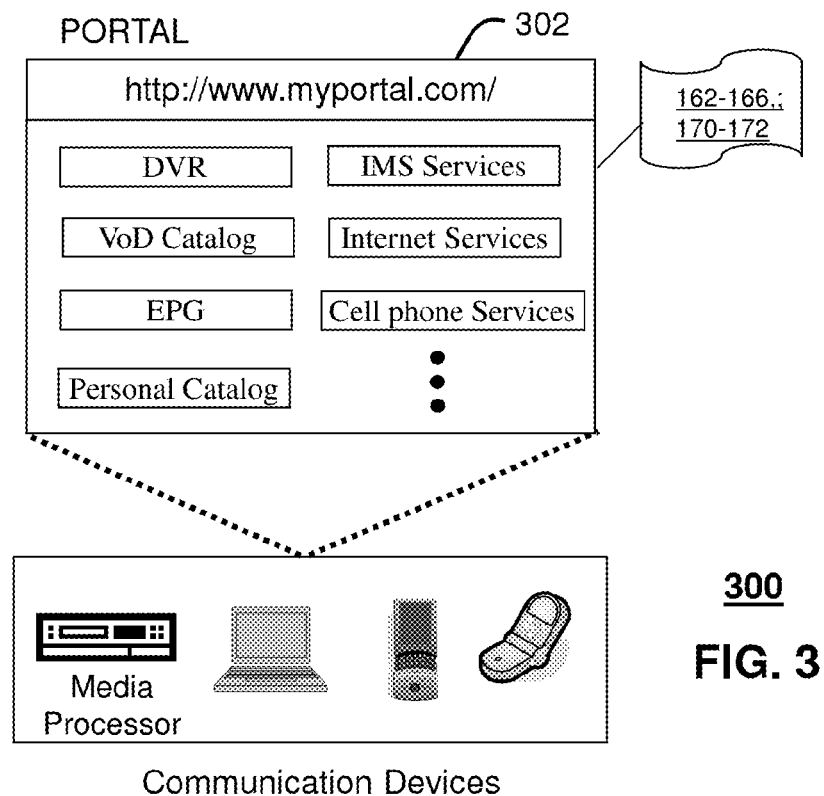
FIG. 3 depicts an illustrative embodiment of a web portal for interacting with the communication systems of FIGS. 1-2.

FIG. 3 depicts an illustrative embodiment of a web portal 302 which can be hosted by server applications operating from the computing devices 130 of the communication system 100 illustrated in FIG. 1. The web portal 302 can be used for managing services of communication systems 100-200. A web page of the web portal 302 can be accessed by a Uniform Resource Locator (URL) with an Internet browser such as Microsoft's Internet Explorer™, Mozilla's Firefox™, Apple's Safari™, or Google's Chrome™ using an Internet-capable communication device such as those described in FIGS. 1-2. The web portal 302 can be configured, for example, to access a media processor 106 and services managed thereby such as a Digital Video Recorder (DVR), a Video on Demand (VoD) catalog, an Electronic Programming Guide (EPG), or a personal catalog (such as personal videos, pictures, audio recordings, etc.) stored at the media processor 106. The web portal 302 can also be used for provisioning IMS services described earlier, provisioning Internet services, provisioning cellular phone services, and so on.

It is contemplated by the present disclosure that the web portal 302 can further be utilized to manage and provision software applications 162-172 of the devices of FIGS. 1-2, respectively, as described earlier.

Figure 4:
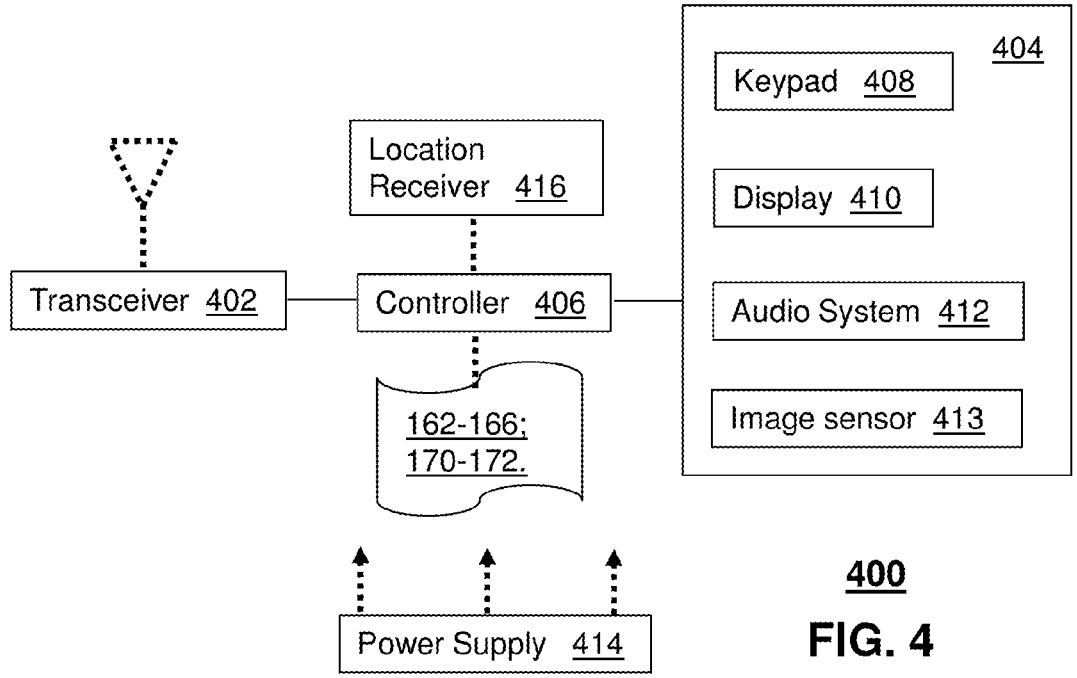
FIG. 4 depicts an illustrative embodiment of a communication device utilized in the communication systems of FIGS. 1-2.

FIG. 4 depicts an exemplary embodiment of a communication device 400. Communication device 400 can serve in whole or in part as an illustrative embodiment of the devices depicted in FIGS. 1-2. The communication device 400 can comprise a wireline and/or wireless transceiver 402 (herein transceiver 402), a user interface (UI) 404, a power supply 414, a location receiver 416, and a controller 406 for managing operations thereof. The transceiver 402 can support short-range or long-range wireless access technologies such as Bluetooth, WiFi, Digital Enhanced Cordless Telecommunications (DECT), or cellular communication technologies, just to mention a few. Cellular technologies can include, for example, CDMA-1X, UMTS/HSDPA, GSM/GPRS, TDMA/EDGE, EV/DO, WiMAX, SDR, LTE, as well as other next generation wireless communication technologies as they arise. The transceiver 402 can also be adapted to support circuit-switched wireline access technologies (such as PSTN), packet-switched wireline access technologies (such as TCPIP, VoIP, etc.), and combinations thereof.

The UI 404 can include a depressible or touch-sensitive keypad 408 with a navigation mechanism such as a roller ball, a joystick, a mouse, or a navigation disk for manipulating operations of the communication device 400. The keypad 408 can be an integral part of a housing assembly of the communication device 400 or an independent device operably coupled thereto by a tethered wireline interface (such as a USB cable) or a wireless interface supporting for example Bluetooth. The keypad 408 can represent a numeric keypad commonly used by phones, and/or a Qwerty keypad with alphanumeric keys. The UI 404 can further include a display 410 such as monochrome or color LCD (Liquid Crystal Display), OLED (Organic Light Emitting Diode) or other suitable display technology for conveying images to an end user of the communication device 400. In an embodiment where the display 410 is touch-sensitive, a portion or all of the keypad 408 can be presented by way of the display 410 with navigation features.

The UI 404 can also include an audio system 412 that utilizes common audio technology for conveying low volume audio (such as audio heard only in the proximity of a human ear) and high volume audio (such as speakerphone for hands free operation). The audio system 412 can further include a microphone for receiving audible signals of an end user. The audio system 412 can also be used for voice recognition applications. The UI 404 can further include an image sensor 413 such as a charged coupled device (CCD) camera for capturing still or moving images.

The power supply 414 can utilize common power management technologies such as replaceable and rechargeable batteries, supply regulation technologies, and charging system technologies for supplying energy to the components of the communication device 400 to facilitate long-range or short-range portable applications. The location receiver 416 can utilize common location technology such as a global positioning system (GPS) receiver capable of assisted GPS for identifying a location of the communication device 400 based on signals generated by a constellation of GPS satellites, thereby facilitating common location services such as navigation.

The communication device 400 can use the transceiver 402 to also determine a proximity to a cellular, WiFi, Bluetooth, or other wireless access points by common sensing techniques such as utilizing a received signal strength indicator (RSSI) and/or a signal time of arrival (TOA) or time of flight (TOF). The controller 406 can utilize computing technologies such as a microprocessor, a digital signal processor (DSP), and/or a video processor with associated storage memory such as Flash, ROM, RAM, SRAM, DRAM or other storage technologies.

The communication device 400 can be adapted to perform the functions of the media processor 106, the media devices 108, or the mobile communication devices 116 of FIG. 1, as well as the IMS CDs 201-202 and PSTN CDs 203-205 of FIG. 2. It will be appreciated that the communication device 400 can also represent other common devices that can operate in communication systems 100-200 of FIGS. 1-2 such as a gaming console and a media player.

The communication device 400 can be adapted to perform the functions of the media processor 106, the media devices 108, or the mobile communication devices 116 of FIG. 1, as well as the IMS CDs 201-202 and PSTN CDs 203-205 of FIG. 2. It will be appreciated that the communication device 400 can also represent other common devices that can operate in communication systems 100-200 of FIGS. 1-2 such as a gaming console and a media player.

Figure 5:
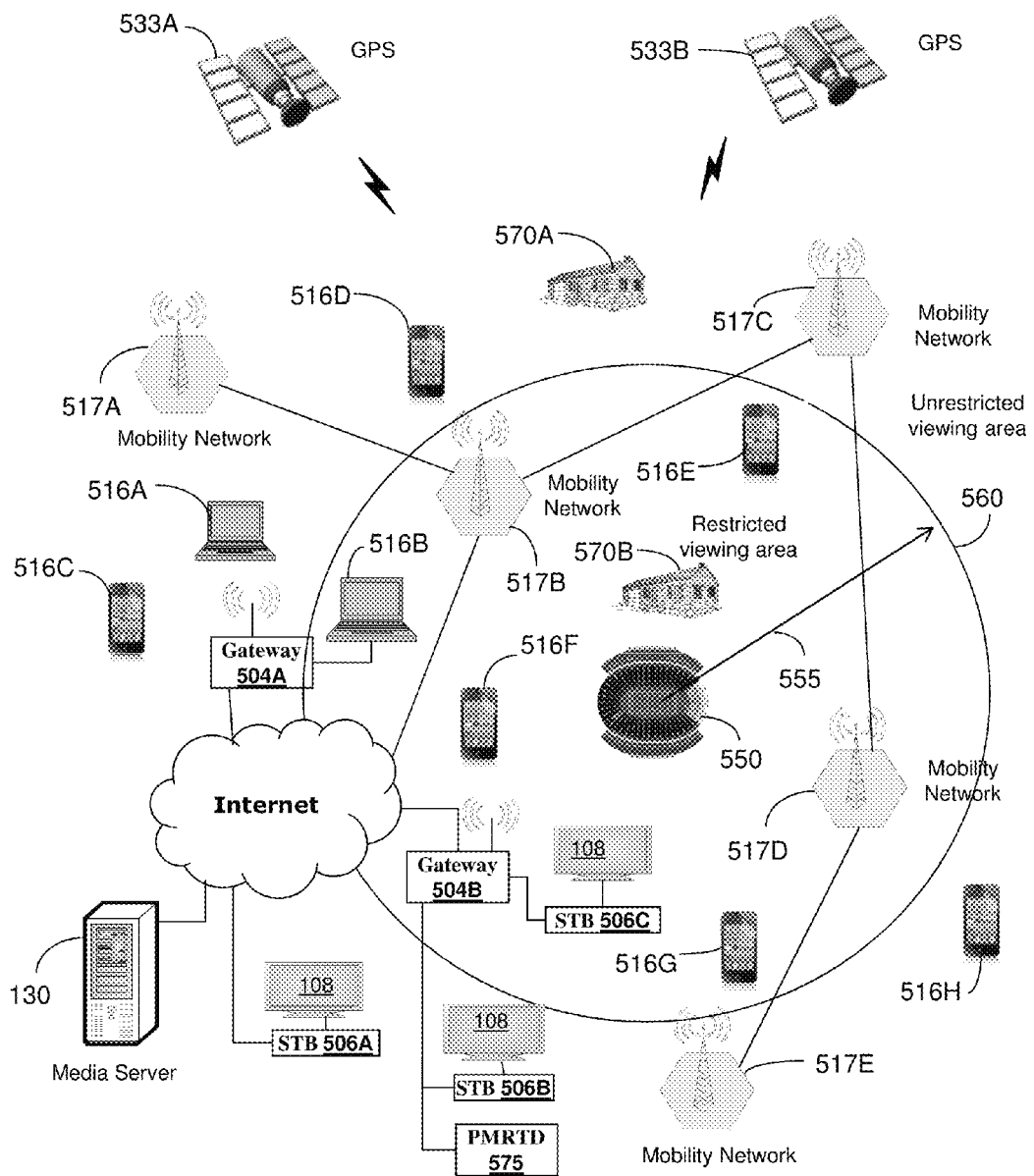
FIG. 5 depicts an illustrative embodiment of a system.

FIG. 5 depicts an illustrative embodiment of a system 500 for distribution of media content in accordance with a restricted viewing area. System 500 can be overlaid or operably coupled to communication systems 100-200 as another representative embodiment of communication systems 100-200. System 500 can include a media server device 130 in communication with media processors 506A-506C (such as set-top boxes) and mobile communication devices 516A-H (such as a laptop computer, tablets, mobile phones, smart phones, etc.). The media processors 506A-506C and mobile communication devices 516A-H can be communicatively coupled to the media server device 130 by way of the Internet. Gateway devices 504A-B and base stations 517A-E of a mobility network can be used to couple mobile communication devices 516A-H to the media server device, to the Internet, or other communication networks. Global positioning satellites 533A-B can provide a means for mobile communication devices 516A-H to determine their geographic locations. Premises 570A-B may be associated with mobile communication devices 516A-H. A personal media retransmitting device 575 can stream media content from a media processor 506B to other devices over the communications network 500.

The present disclosure contemplates a media server device 130 that, among other things, is capable of distribution of media content subject to a restricted viewing area 560. The media server device 130 can be used to receive media content and to determine if that media content is associated with a restricted viewing area 560. An exemplary restrictive viewing area 560 is depicted herein as a radius 555 surrounding a sporting stadium 550. The media server device 130 can also be used to receive geographic location information from a mobile communication device 516A-H and to transmit media content to a mobile communication device 516A-H responsive to determining a relationship between the restricted viewing area 560 and the geographic location of the mobile communication device 516A-H. The media server device 130 can thereby control distribution of media content subject to viewing area restrictions according to the illustrative embodiments of methods 600-700 of FIGS. 6-7. By applying the media server device 130, as described above, media content can be distributed to mobile communication devices 516A-H in a telecommunication system 100 while adhering to restrictions imposed by licensing arrangements associated with the media content.

Figure 6:
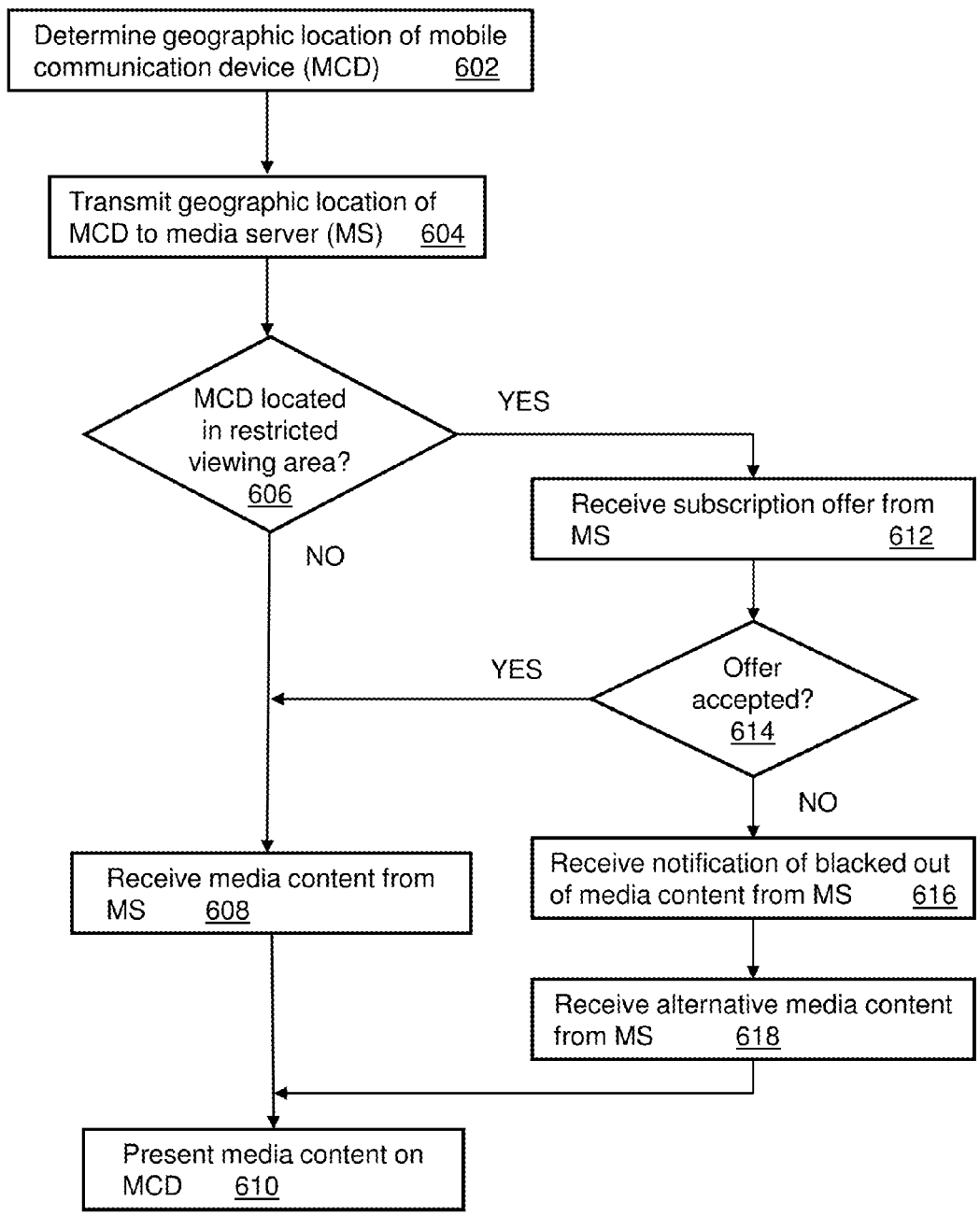
FIGS. 6-7 depict illustrative embodiments of methods operating in portions of the systems described in FIGS. 1-5.

FIG. 6 depicts an illustrative method 600 that operates in portions of the devices of FIGS. 1-5. Method 600 can begin with step 602 in which a geographic location for a mobile communication device 516A-H can be determined. The mobile communication device 516A-H can be a portable communication device, such as a computing device, wireless computing device, mobile phone, or smart phone device. The mobile communication device 516A-H can receive media content from the communication system 100 via base stations 517A-E of a mobility network or by wired or wireless connection to the Internet via gateway devices 504A-B.

In one embodiment, the mobile communication device 516A-H can determine its geographic location by use of a global positioning satellite (GPS) system. The mobile communication device 516A-H can receive signals from global positioning satellites 533A-533B. The mobile communication device 516A-H can calculate its geographic location by trilateration of the time and orbital information embedded in the global positioning satellite signals. The mobile communication device 516A-H can precisely calculate its geographic location independent of earth-bound objects. For example, a global positioning satellite receiver on the mobile communication device 516H can receive signals from satellites 533A-B and can process those signals to determine the geographic location of mobile communication device 516H as somewhere southeast of the sporting stadium 550 and outside the area 560 defined by radius 555. If the same mobile communication device 516H is associated with premises 570B (e.g., the user of the mobile communication device 516H lives at premises 570B) and is communicating with the media server device 130 by way of base station 517D of the mobility network, then the apparent location of the mobile communication device 516H is somewhere within the area 560, since both the premises 570B and the base station 517D are within the area. However, the use of the global positioning system allows the geographic location of the mobile communication device 516H to be more accurately determine and confirms that it is outside the area.

The mobile communication device 516A-H can receive global positioning satellite signals and then calculate its geographic location. In one embodiment, the mobile communication device 516A-H can receive global positioning satellite signals and can send these signals to another device, such as the media server device 130 or another mobile communication device 516A-H, where the calculation can be performed to determine the geographic location. The geographic location can then be sent to the mobile communication device 516A-H.

In one embodiment, the mobile communication device 516A-H can determine its geographic location by use of an internet protocol (IP) communication system. The mobile communication device 516A-H can establish communications with an internet protocol communication network. The mobile communication device 516A-H can receive an internet protocol address from the internet protocol communication network. The mobile communication device 516A-H can then determine its geographic location according to a geographic location associated with the internet protocol address. For example mobile communication device 516C can establish communications with the Internet by way of a wireless connection to gateway device 504A. Mobile communication device 516C can then receive an internet protocol address through the gateway device 504A. Mobile communication device 516C can look-up a location associated with the internet protocol address and use this location as its own geographic location. For example, if the location associated with the internet protocol address is the physical location of the gateway device 504A, then the mobile communication device 516C will store the physical location of the gateway device 504A as its own geographic location. Again, this location is independent of any premises 570A-B associated with the mobile communication device 516C or with any base station, such as base station 517A, currently communicating with the mobile device.

The mobile communication device 516A-H can form a wired or wireless connection to a gateway device 504A-B that is in communication with the Internet. The mobile communication device 516A-H can capture an internet protocol address assigned to the mobile communication device 516A-H or to the gateway device 504A-B by the Internet. The mobile communication device 516A-H can send this internet protocol address in a request to a database, such as the WHOIS database of the Corporation for Assigned Names and Numbers (CANN). The mobile communication device 516A-H can receive a response from the database describing the geographic location associate with that internet protocol address. In one embodiment, the mobile communication device 516A-H can store all or part of a database of an internet protocol addresses and locations for purposes of performing the location search locally.

In one embodiment, the mobile communication device 516A-H can establish communications with a base station 517A-E of a mobile communication network. The mobile communication device 516A-H can then determine its geographic location according to a geographic location of the base station 517A-E. For example, the mobile communication device 516G can establish communications with base station 517E to access the mobility network. The base station 517E can send the mobile communication device 516G location information for the base station 517E. The mobile communication device 516G can then use this location information for the base station 517E as its own geographic location.

The base station 517A-E can store and report to the mobile communication device 516A-H its physical location. The base station 517A-E can store and report a code unique to the base station so that the mobile communication device 516A-H can look-up the physical location of the base station in a database either on the mobile communication device, another mobile communication device 516A-H, or over the Internet. The mobile communication device 516A-H can establish communications with multiple base station 517A-E and determine the locations of each of these multiple base station 517A-E. The mobile communication device 516A-H can then calculate its own geographic location based on the locations of these multiple base stations 517A-E.

In step 604, the geographic location of the mobile communication device 516A-H can be transmitted from the mobile communication device 516A-H to the media server device 130. The geographic location can be transmitted to the media server device 130 on a periodic basis. The mobile communication device 516A-H can send its geographic location in response to a request by the media server device 130. The mobile communication device 516A-H can broadcast its geographic location to the media server device 130 without waiting for a request.

The mobile communication device 516A-H can determine if the mobile communication device 116 is inside or outside of the restricted viewing area 560 in step 606. The mobile communication device 516A-H can receive information describing a restricted viewing area 560 from the media server device 130. The restricted viewing area 560 can be associated with a sporting event as a local blackout rule. For example, the National Football League (NFL) requires that local broadcasts of games be restricted, or blacked out, if the football stadium 550 has not sold out all of its ticket prior to the game. In such cases, a blackout area 560 is defined as a radius 555 of 75 miles surrounding the stadium 550. A local over-the-air broadcaster whose signal services any part of this blackout area 560 is prohibited from broadcasting a live feed of the unsold game. The mobile communication device 516A-H can compare its current geographic location with geographic information defining the restricted viewing area 560, if such an area has been required for the media content, to determine if the mobile communication device 516A-H is inside or outside of the restricted viewing area 560.

If the mobile communication device 516A-H is determined to be outside of the restricted viewing area 560 in step 606, then the media content can be received by the mobile communication device 516A-H from the media server device 130 in step 608. The media content can be any combination of text, audio, still images, video, three-dimensional images and video, graphics, gaming, or computer-generated media. The media content can be a combination of content sourced from the media server device 130 and content generated or modified by the mobile communication device 516A-H.

In one embodiment, the media server device 130 only sends the media content to the mobile communication device 516A-H if the mobile communication device 516A-H is outside of the restricted viewing area 560. The media server device 130 can determined whether to send the media content to the mobile communication device 516A-H based on the geographic location reported by mobile communication device 516A-H. The media server device 130 can determine whether the mobile communication device 516A-H is inside or outside the restricted viewing area 560 based the geographic location of the mobile communication device 516A-H and comparing this to the location of the restricted viewing area 560. In one embodiment, the media server device 130 can send the media content to the mobile communication device 516A-H without considering the restrictive viewing area. In this case, the mobile communication device 516A-H determines whether or not to present the media content based on determining in it is inside the restrictive viewing area 560.

The media content can be presented on the mobile communication device 516A-H in step 610. The mobile communication device 516A-H can adapt the presentation of the media content to the capabilities of the mobile communication device 516A-H. For example, the mobile communication device 516A-H can alter the resolution or the aspect ratio of video content or can time delay the presentation of the media content.

If the mobile communication device 516A-H is determined to be inside of the restricted viewing area in step 606, then a subscription offer can be received by the mobile communication device 516A-H from the media server device 130 in step 612. The subscription can be in the form of a digital license to enable the mobile communication device 516A-H to receive the media content regardless of any local blackout or restricted viewing area 560. The subscription can be offered for sale or as part of a discount or reward to the user of the mobile communication device 516A-H. The subscription can be a one-time license for a single media content event, such as a single football game, or a season-long license, or a multiple content license, such as a package of professional football and basketball games. The subscription can be sent by the media server device 130 or by another network device.

If the subscription offer is accepted by the mobile communication device 516A-H in step 614, then the media content can be received by the mobile communication device 516A-H from the media server device 130 in step 608. The subscription offer can be accepted by, for example, an email message or text message emanating from the mobile communication device 516A-H, or a user input associated with a website accessed by the mobile communication device 516A-H. The subscription acceptance can be a successful authorization for payment. If the subscription offer is not-accepted by the mobile communication device 516A-H in step 614, then the mobile communication device 116 can receive a notification from the media server device 130 that the media content has been blacked out from the mobile communication device 516A-H in step 616.

If the mobile communication device 516A-H is determined to be inside of the restricted viewing area in step 606, then the mobile communication device 516A-H can receive alternative media content from the media server device 130 in step 618. The alternative media content can be transmitted to the mobile communication device 516A-H by the media server device 130. Where the blacked out media content is a football game, the alternative media content can be a different football game. The alternative media content can also be content associated with the mobile communication device 516A-H. For example, the media server device 130 can select a different football game based on participating teams who are geographically related to the geographic location of the mobile communication device 516A-H. The media server device can select media content based on a premises 570A-B that is associated with the mobile communication device 516A-H. For example, if the user of a mobile communication device 516A-H resides in a city that is different from the current geographic location of the mobile communication device 516A-H, then the media server device 130 can transmit a football game or other media content from the "local television market" of the user's city of residence. The media server device 130 can derive information about the user of the mobile communication device 516A-H from a subscriber database or from information stored on the mobile communication device 516A-H, such as the SIM card.

Figure 7:
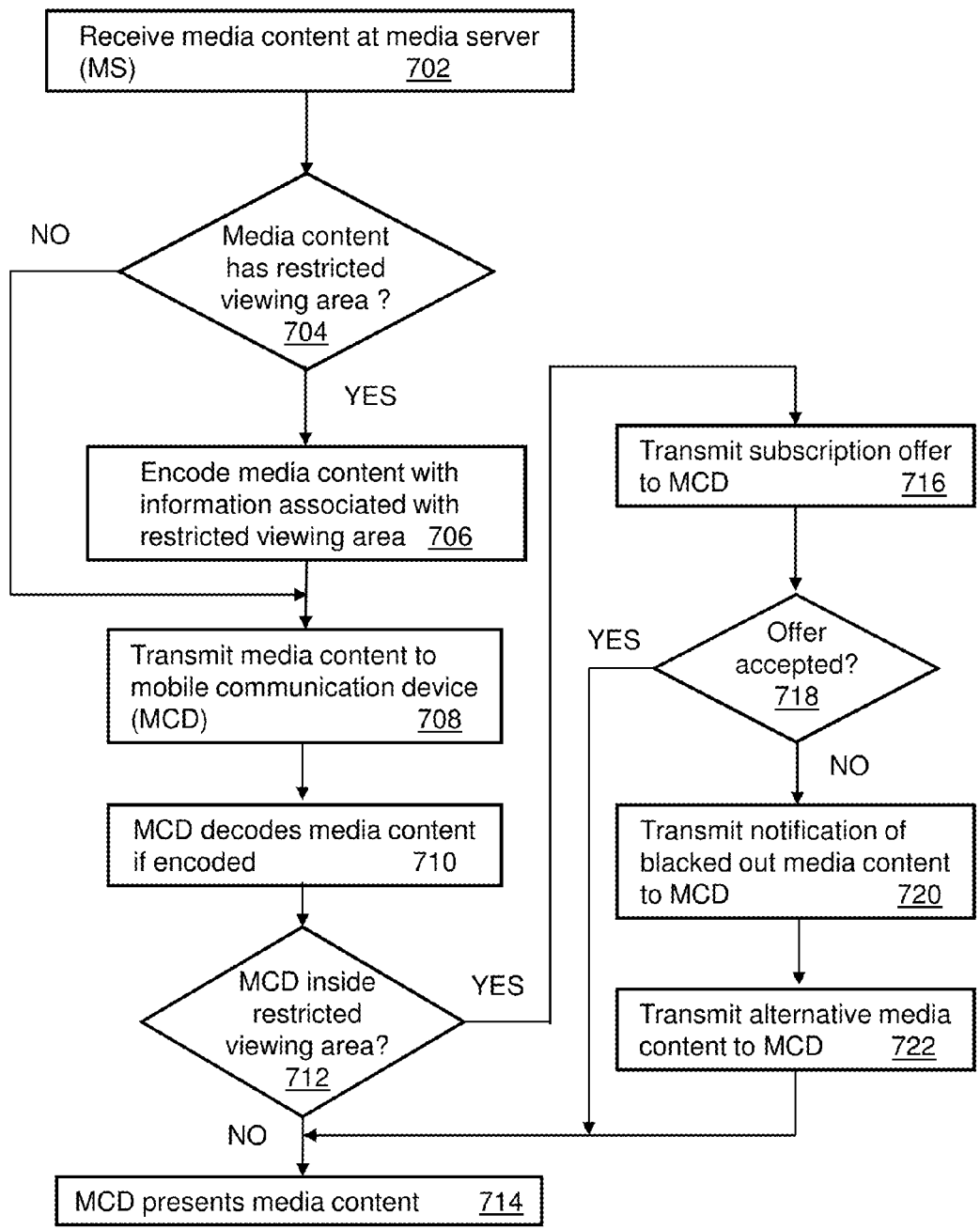

FIG. 7 depicts another illustrative method 700 that operates in portions of the devices of FIGS. 1-5. Method 700 can begin with step 702 in which media content can be received at a media server device 130. In step 704, the media server device 130 can determine if that the media content is associated with a restricted viewing area 560. The media server device 130 can receive information about blackouts or viewing restrictions from a content source. For example, the NFL publishes blackout information prior to every game. The restricted viewing area 560 information can also be included in the media content as data encoded into header information for the data stream. The restricted viewing area 560 can be static or dynamic. The restricted viewing area 560 can include information on mobile communication devices 516A-H or associated users who have subscribed to a license to enable presentation of the media content regardless of restrictions. The subscription may incorporate lessor restrictions, such as the ability to listen to an audio feed of the media content but not view a full media stream. For example, the media server can enable purchasers of tickets to a sporting event to view media content, such as replays, on mobile communication devices 516A-H even if the sporting event is subject to local blackout.

If the media content is associated with a restriction, the media server device 130 can encode the media content with information associated with the restricted viewing area 560 in step 706. The media server device 130 can encode the geographic coordinates or a database convertible code of the restricted viewing area 560 into a data stream of the media content. The media server device 130 can encrypt the media content and make decryption dependent upon a geographic location of a mobile communication device 516A-H.

The media server device 130 can transmit the media content to the mobile communication device 516A-H in step 708. The mobile communication device 516A-H can decode the media content, if encoded, in step 710. The mobile communication device 516A-H can be determined to be in the restricted viewing area 560 in step 712. Responsive to a determination that the mobile communication device 516A-H is outside of the restricted viewing area 560 in step 712, the mobile communication device 116 can present the media content in step 714. In one embodiment, the media content is encrypted based on the restricted viewing area 560. A decryption key, stored on the mobile communication device 516A-H, can only be enabled if the geographic location of the mobile communication device 516A-H is outside of the restricted viewing area 560.

Responsive to a determination that the mobile communication device 516A-H is inside of the restricted viewing area 560 in step 712, the media server device 130 can transmit a subscription offer to the mobile communication device 516A-H in step 716. If the subscription offer is accepted by the mobile communication device 516A-H in step 718, then the mobile communication device 516A-H can present the media content from the media server device 130 in step 714. In one embodiment, a blackout independent decryption key is sent to the mobile communication device 516A-H. This decryption key enables the mobile communication device 516A-H to decrypt the media content regardless of any restricted viewing areas 560 in effect.

If the subscription offer is not accepted by the mobile communication device 516A-H in step 718, then the media server device 130 can transmit a notification to the mobile communication device 116 that the media content has been blacked out from the mobile communication device 516A-H in step 720. The media server device 130 can transmit alternative media content to the mobile communication device 516A-H in step 722.

Upon reviewing the aforementioned embodiments, it would be evident to an artisan with ordinary skill in the art that said embodiments can be modified, reduced, or enhanced without departing from the scope and spirit of the claims described below. For example, in one embodiment, a mobile communication device 516A-H can receive media content from a personal media retransmitting device 575. The personal media retransmitting device 575 can be a device, such as a Slingbox™, manufactured by the Sling Media Corporation, which can send streaming media from a media processor device 506B to another device over a network. The mobile communication device 516A-H can receive media content from the personal media retransmitting device 575. The mobile communication device 516A-H can disable presentation on the mobile communication device of media content from the personal media retransmitting device 575 according to the geographic location of the mobile communication device and the restricted viewing area 560 associated with the media content. The mobile communication device 516A-H can thereby prevent the personal media retransmitting device 575 from circumventing a restrictive viewing area arrangement.

In one embodiment, the media server device 130 only encrypts the media content if a restricted viewing area 560 is in effect in at least one location for the media content.

In one embodiment, the mobile communication device 516A-H can use signal strength information associated with a base station 517A-E to estimate the distance between the mobile communication device 516A-H that base station to determine its geographic location as an offset from the location of the base station.

In one embodiment, the mobile communication device 516A-H can combine reported locations of multiple base stations 517A-E with signal strength data for multiple base stations to improve the accuracy of the determined geographic location. Other embodiments are contemplated by the present disclosure.

Figure 8:
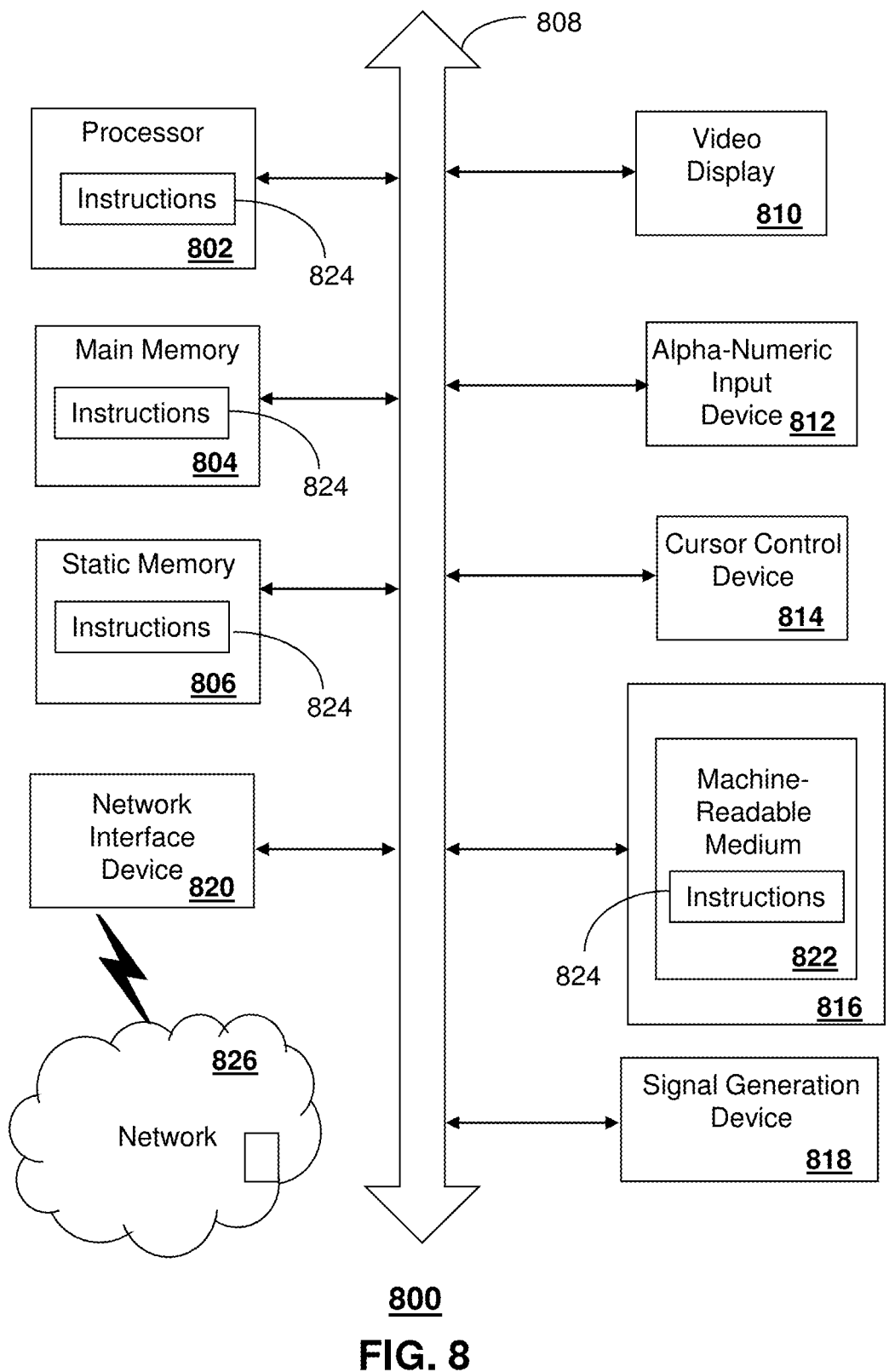
FIG. 8 is a diagrammatic representation of a machine in the form of a computer system within which a set of instructions, when executed, may cause the machine to perform any one or more of the methods discussed herein.

FIG. 8 depicts an exemplary diagrammatic representation of a machine in the form of a computer system 800 within which a set of instructions, when executed, may cause the machine to perform any one or more of the methods discussed above. One or more instances of the machine can operate, for example, as the media server device 130, the media processor 506A-C, the gateway 504A-B, the mobile communication device 516A-H, or combinations thereof as described above. In some embodiments, the machine may be connected (e.g., using a network) to other machines. In a networked deployment, the machine may operate in the capacity of a server or a client user machine in server-client user network environment, or as a peer machine in a peer-to-peer (or distributed) network environment.

The machine may comprise a server computer, a client user computer, a personal computer (PC), a tablet PC, a smart phone, a laptop computer, a desktop computer, a control system, a network router, switch or bridge, or any machine capable of executing a set of instructions (sequential or otherwise) that specify actions to be taken by that machine. It will be understood that a communication device of the present disclosure includes broadly any electronic device that provides voice, video or data communication. Further, while a single machine is illustrated, the term "machine" shall also be taken to include any collection of machines that individually or jointly execute a set (or multiple sets) of instructions to perform any one or more of the methods discussed herein.

The computer system 800 may include a processor 802 (e.g., a central processing unit (CPU), a graphics processing unit (GPU, or both), a main memory 804 and a static memory 806, which communicate with each other via a bus 808. The computer system 800 may further include a video display unit 810 (e.g., a liquid crystal display (LCD), a flat panel, or a solid state display. The computer system 800 may include an input device 812 (e.g., a keyboard), a cursor control device 814 (e.g., a mouse), a disk drive unit 816, a signal generation device 818 (e.g., a speaker or remote control) and a network interface device 820.

The disk drive unit 816 may include a tangible computer-readable storage medium 822 on which is stored one or more sets of instructions (e.g., software 824) embodying any one or more of the methods or functions described herein, including those methods illustrated above. The instructions 824 may also reside, completely or at least partially, within the main memory 804, the static memory 806, and/or within the processor 802 during execution thereof by the computer system 800. The main memory 804 and the processor 802 also may constitute tangible computer-readable storage media.

Dedicated hardware implementations including, but not limited to, application specific integrated circuits, programmable logic arrays and other hardware devices can likewise be constructed to implement the methods described herein. Applications that may include the apparatus and systems of various embodiments broadly include a variety of electronic and computer systems. Some embodiments implement functions in two or more specific interconnected hardware modules or devices with related control and data signals communicated between and through the modules, or as portions of an application-specific integrated circuit. Thus, the example system is applicable to software, firmware, and hardware implementations.

In accordance with various embodiments of the present disclosure, the methods described herein are intended for operation as software programs running on a computer processor. Furthermore, software implementations can include, but not limited to, distributed processing or component/object distributed processing, parallel processing, or virtual machine processing can also be constructed to implement the methods described herein.

While the tangible computer-readable storage medium 622 is shown in an example embodiment to be a single medium, the term "tangible computer-readable storage medium" should be taken to include a single medium or multiple media (e.g., a centralized or distributed database, and/or associated caches and servers) that store the one or more sets of instructions. The term "tangible computer-readable storage medium" shall also be taken to include any non-transitory medium that is capable of storing or encoding a set of instructions for execution by the machine and that cause the machine to perform any one or more of the methods of the present disclosure.

The term "tangible computer-readable storage medium" shall accordingly be taken to include, but not be limited to: solid-state memories such as a memory card or other package that houses one or more read-only (non-volatile) memories, random access memories, or other re-writable (volatile) memories, a magneto-optical or optical medium such as a disk or tape, or other tangible media which can be used to store information. Accordingly, the disclosure is considered to include any one or more of a tangible computer-readable storage medium, as listed herein and including art-recognized equivalents and successor media, in which the software implementations herein are stored.

Although the present specification describes components and functions implemented in the embodiments with reference to particular standards and protocols, the disclosure is not limited to such standards and protocols. Each of the standards for Internet and other packet switched network transmission (e.g., TCP/IP, UDP/IP, HTML, HTTP) represent examples of the state of the art. Such standards are from time-to-time superseded by faster or more efficient equivalents having essentially the same functions. Wireless standards for device detection (e.g., RFID), short-range communications (e.g., Bluetooth, WiFi, Zigbee), and long-range communications (e.g., WiMAX, GSM, CDMA) are contemplated for use by computer system 800.

The illustrations of embodiments described herein are intended to provide a general understanding of the structure of various embodiments, and they are not intended to serve as a complete description of all the elements and features of apparatus and systems that might make use of the structures described herein. Many other embodiments will be apparent to those of skill in the art upon reviewing the above description. Other embodiments may be utilized and derived therefrom, such that structural and logical substitutions and changes may be made without departing from the scope of this disclosure. Figures are also merely representational and may not be drawn to scale. Certain proportions thereof may be exaggerated, while others may be minimized. Accordingly, the specification and drawings are to be regarded in an illustrative rather than a restrictive sense.

Although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

The Abstract of the Disclosure is provided with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. A mobile communication device, comprising:
    a memory to store executable instructions; and
    a processor coupled to the memory, wherein the executable instructions facilitate performance of operations comprising:
        determining a geographic location of the mobile communication device;
        receiving first information describing a restricted viewing area associated with first media content;
        determining if the mobile communication device is within the restricted viewing area;
        transmitting to a communication network second information describing whether the mobile communication device is in the restricted viewing area or is not in the restricted viewing area;
        receiving an encrypted version of first media content from the communication network according to the mobile communication device being outside of a restricted viewing area associated with the first media content;
        receiving a decryption key for the encrypted version of the first media content from the communication network;
        decrypting the encrypted version of the first media content via the decrypting key to generate an unencrypted version of the first media content;
        receiving alternative media content from the communication network according to the mobile communication device being inside the restricted viewing area associated with the first media content; and
        presenting one of the unencrypted version of the first media content or the alternative media content.

2. The mobile communication device of claim 1, wherein the processor further performs operations comprising receiving a notification of blacking out of the first media content according to determining that the geographic location is inside the restricted viewing area.

3. The mobile communication device of claim 1, wherein the processor further performs operations comprising receiving a subscription offer from the communication network according to the determining that the geographic location is inside the restricted viewing area.

4. The mobile communication device of claim 1, wherein the processor further performs operations comprising:
    receiving signals from a global positioning system; and
    calculating the geographic location of the mobile communication device from the signals of the global positioning system.

5. The mobile communication device of claim 1, wherein the processor further performs operations comprising:
    facilitating establishment of communications with an internet protocol communication network; and
    receiving an internet protocol address from the internet protocol communication network, wherein the geographic location of the mobile communication device is determined according to a network geographic location associated with the internet protocol address.

6. The mobile communication device of claim 1, wherein the processor further performs operations comprising facilitating establishment of communications with a base station of a mobile communication network and wherein the geographic location of the mobile communication device is determined according to a station geographic location of the base station of the mobile communication network.

7. The mobile communication device of claim 1, wherein the geographic location of the mobile communication device is determined according to a network location received from the communication network.

8. The mobile communications device of claim 1, wherein the processor further performs operations comprising:
    receiving a subscription offer from the communication network according to determining that the geographic location of the mobile communication device is inside the restricted viewing area; and
    transmitting an acceptance of the offer to the communication network.

9. The mobile communications device of claim 8, wherein the acceptance comprises one of an email message or a text message.

10. The mobile communication device of claim 1, wherein the first media content or the alternative media content is received from the communication network by way of a personal media retransmitting device at a premises associated with the mobile communication device.

11. A non-transitory machine-readable storage medium comprising executable instructions, which when executed by a processor facilitate performance of operations comprising:
    determining that first media content is associated with a restricted viewing area;
    transmitting first information describing the restricted viewing area to a mobile communication device;
    receiving second information from the mobile communication device describing whether the mobile communication device is in the restricted viewing area of is not in the restricted viewing area;
    transmitting an alternative media content to the mobile communication device according to the mobile communication device being within the restricted viewing area;
    transmitting a decryption key to the mobile communication device according to the mobile communication device being outside of the restricted viewing area; and
    transmitting an encrypted version of the first media content to the mobile communication device according to the mobile communication device being outside of the restricted viewing area, wherein the mobile communication device decrypts the encrypted version of the first media content via the decryption key to generate an unencrypted version of the first media content.

12. The non-transitory machine-readable storage medium of claim 11, wherein the first media content and the alternative media content are configured for decoding by the mobile communication device.

13. The non-transitory machine-readable storage medium of claim 11, comprising executable instructions that cause the processor to further perform operations comprising sending a notification to the mobile communication device that the first media content is not available to the mobile communication device responsive to the the mobile communication device being within of the restricted viewing area associated with the media content.

14. The non-transitory machine-readable storage medium of claim 11, comprising executable computer instructions to cause the processor to further perform operations comprising:
transmitting an offer for a subscription service to the mobile communication device to enable a presentation of the first media content on the mobile communication device without regard to the restricted viewing area associated with the media content; and
receiving from the mobile communication device a reply to the offer.

15. A method comprising:
receiving, by a system comprising a processor, information describing whether a mobile communication device is within a restricted viewing area or is not within the restricted viewing area, wherein the mobile communication determines the information;
transmitting, by the system, an alternative media content to the mobile communication device according to the mobile communication device being within the restricted viewing area;
transmitting, by the system, a decryption key to the mobile communication device according to the mobile communication device being outside of the restricted viewing area; and
transmitting, by the system, an encrypted version of first media content for presentation at the mobile communication device according to the mobile communication device being outside of the restricted viewing area, wherein the mobile communication device decrypts the encrypted version of the first media content via the decryption key to generate an unencrypted version of the first media content.

16. The method of claim 15, further comprising transmitting, by the system, a notification of blacking out of the first media content according to the mobile communication device being inside the restricted viewing area.

17. The method of claim 15, wherein a geographic location of the mobile communication device is calculated from signals received by the mobile communication device.

18. The method of claim 15, wherein a geographic location of the mobile communication device is determined from a network geographic location associated with an internet protocol address that is associated with the mobile communication device.

19. The method of claim 15, wherein a geographic location of the mobile communication device is determined from a network geographic location of an access point of a mobile communication network being utilized by the mobile communication device.

* * * * *